July 14, 1925.

J. BERG

LATCHING DEVICE

Original Filed Aug. 3, 1921

1,546,192

Inventor
John Berg
by Hazard and Miller
Att'ys

Patented July 14, 1925.

1,546,192

UNITED STATES PATENT OFFICE.

JOHN BERG, OF EUREKA, CALIFORNIA.

LATCHING DEVICE.

Original application filed August 3, 1921, Serial No. 489,530. Divided and this application filed December 29, 1922. Serial No. 609,606.

*To all whom it may concern:*

Be it known that I, JOHN BERG, a citizen of the United States, residing at Eureka, in the county of Humboldt and State of California, have invented new and useful Improvements in Latching Devices, of which the following is a specification.

My invention relates to latching devices, and is a division of my co-pending application, Serial No. 489,530, filed August 3rd, 1921.

The purpose of my invention is the provision of a latching device particularly adapted, although not necessarily, for releasably connecting the sections of a collapsible tent pole to rigidly maintain the sections in fully extended position.

Although I have herein shown and described only one form of latching device embodying my invention, it is to be understood that various changes and modifications may be made herein without departing from the spirit of the invention and the spirit and scope of the appended claims.

Figure 1:
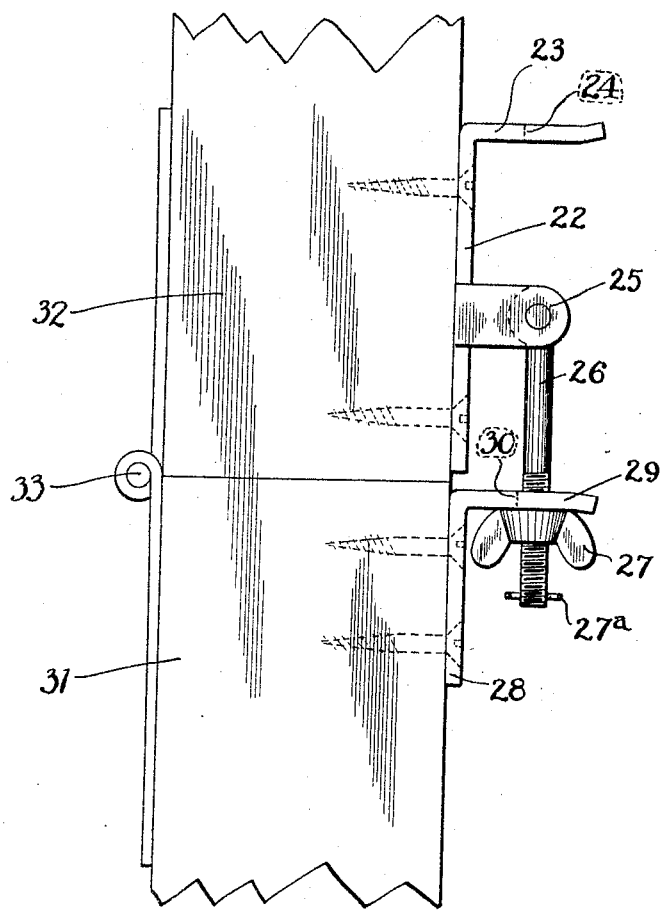
Figure 2:
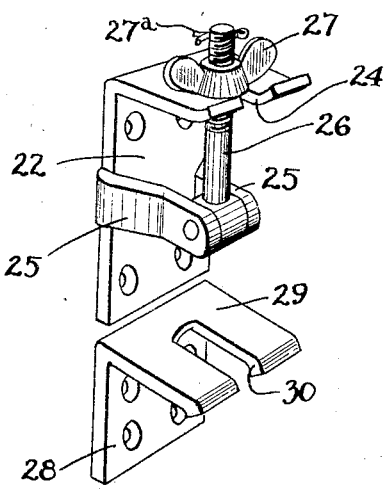

In the accompanying drawing,

Figure 1 is a view showing in side elevation two sections of a tent pole or other form of support having applied thereto one form of latching device embodying my invention, Figure 2 is a detail perspective view of the latching device shown in Figure 1.

Referring specifically to the drawings in which similar reference characters refer to similar parts, my invention in its present embodiment comprises an inverted L-shaped plate 22 provided with screw receiving openings by means of which it is adapted to be secured to one of the sections of the tent pole. The horizontal portion of the plate 22 constitutes a lip 23, which as shown is provided with a slot 24. Below the lip 23, the plate 22 is formed with a pair of spaced ears 25 between which is pivotally sustained the head of a bolt 26 carrying a wing nut 27, maintained against accidental displacement from the bolt by means of a cotter pin 27ª.

The latching device also includes another L shaped plate 28, the horizontal portion of which provides a lip 29 formed with a slot 30. This plate 28 is likewise formed with screw receiving openings for securing the plate as a unit to another section of a tent pole.

In Figure 1, I have shown two sections 31 and 32 of a tent pole or other form of support, which are connected at their ends by means of a hinge 33 so as to allow the sections to be folded one upon the other or to occupy an extended position as shown.

In the applied position of the latching device, the plate 22 is secured to the upper section 32 at a point adjacent its lower end, with the lip 23 projecting at right angles from the adjacent face of the section. Similarly, the plate 28 is secured to the upper end of the lower section 31 and at the same side of the section as the plate 22. In this applied position of the plate 28, the lip 29 extends at right angles to the adjacent face of the section and is disposed in spaced parallelism with respect to the lip 23 when the sections are in the extended position as shown in Figure 1. The bolt 26, by virtue of its mounting, can be swung to engage within the slot 24 upon the lip 23 or within the slot 30 of the lip 29, and it will be understood that by an adjustment of the nut 27, the bolt may be placed under tension to securely retain it in either slot against displacement. When desiring to lock the sections 31 and 32 in extended position as shown in Figure 1, the bolt 26 is moved to the position shown in Figure 1 so as to be disposed within the slot 30, and by an adjustment of the nut 27 the bolt may be securely retained in engagement with the lip and under tension so as to maintain the two sections in extended position. When it is desired to fold the sections, a manipulation of the nut 27 releases the bolt 26 so that it may be removed from the slot 30 thereby allowing of the folding of the sections. In the folded position of the sections, the bolt 26 is swung into the slot 24 and secured therein by a manipulation of the nut so as to prevent displacement.

I claim as my invention:

1. In combination, a pair of hinged members adapted to swing into a line end to end, and a latching device at the opposite sides of the members from the hinge for maintaining the same in extended position comprising a pair of plates secured to the respective members, and a member movable to engage either of the plates and to be placed under tension.

2. In combination, a pair of hinged members adapted to swing into a line end to end, and a latching device at the opposite sides of the members from the hinge for maintaining the members in extended position comprising a pair of L-shaped plates secured to the respective members and provided with slots, ears formed on one of the plates, a bolt pivoted between the ears and adapted to extend through the slot of either one of the plates, and a nut carried by the bolt and engagable with the last mentioned plate for maintaining the bolt against displacement from the slot.

3. A latching device of the character described comprising spaced slotted plates, a bolt pivotally sustained on one of the plates to engage within the slot of either plate, and a nut mounted on the bolt and adapted to engage either of the plates for maintaining the bolt within the slots.

4. The combination with two members adapted to fit together end to end and a hinge connecting the two members at one side, of latching mechanism secured against the opposite sides of the members from the hinge and comprising attaching plates secured to the members on opposite sides of the line of separation, slotted members extending from corresponding ends of the attaching plates, ears extending from the sides of one attaching plate, a bolt pivotally connected to the ears and adapted to swing into the slot of either slotted member, and a nut upon the bolt so that the bolt may be swung into the slot of the opposite attaching member from the ears and tightened, and so that the bolt may be swung into the other slot and tightened.

In testimony whereof I have signed my name to this specification.

JOHN BERG.